United States Patent
Heinzmann et al.

(10) Patent No.: US 8,165,347 B2
(45) Date of Patent: Apr. 24, 2012

(54) VISUAL TRACKING EYE GLASSES IN VISUAL HEAD AND EYE TRACKING SYSTEMS

(75) Inventors: Jochen Heinzmann, Kambah (AU); Dennis Tell, Zurich (CH); Grant Grubb, Campbell (AU)

(73) Assignee: Seeing Machines Pty Ltd (AU)

(*) Notice: Subject to any disclaimer, the term of this patent is extended or adjusted under 35 U.S.C. 154(b) by 894 days.

(21) Appl. No.: 12/130,719

(22) Filed: May 30, 2008

(65) Prior Publication Data

US 2008/0285801 A1 Nov. 20, 2008

Related U.S. Application Data

(63) Continuation of application No. PCT/AU2006/001824, filed on Nov. 30, 2006.

(30) Foreign Application Priority Data

Nov. 30, 2005 (AU) ................................. 2005906710

(51) Int. Cl.
*G06K 9/00* (2006.01)
(52) U.S. Cl. .................... 382/103; 382/100; 382/154
(58) Field of Classification Search .................. 382/100, 382/103, 154
See application file for complete search history.

(56) References Cited

U.S. PATENT DOCUMENTS

| | | | |
|---|---|---|---|
| 6,980,671 B2* | 12/2005 | Liu et al. | 382/118 |
| 7,043,056 B2* | 5/2006 | Edwards et al. | 382/103 |
| 7,197,165 B2* | 3/2007 | Ryan | 382/103 |
| 7,578,593 B2* | 8/2009 | Hammoud et al. | 351/246 |
| 2002/0039111 A1* | 4/2002 | Gips et al. | 345/700 |
| 2003/0169907 A1* | 9/2003 | Edwards et al. | 382/118 |
| 2007/0291231 A1* | 12/2007 | Hammoud et al. | 351/222 |

FOREIGN PATENT DOCUMENTS

| | | |
|---|---|---|
| EP | 1239405 A2 | 9/2002 |
| GB | 2333590 A | 7/1999 |
| JP | 11015979 A | 1/1999 |
| JP | 2001034756 A | 2/2001 |
| JP | 2003132339 A | 5/2003 |
| JP | 2004070514 A | 3/2004 |

(Continued)

OTHER PUBLICATIONS

Heo et al., "Performance Evaluation of Face Recognition using Visual and Thermal Imagery with Advanced Correlation Filters," Department of Electrical and Computer Engineering, Jun. 20, 2005, pp. 1-6.*

(Continued)

*Primary Examiner* — Andrew W Johns
*Assistant Examiner* — Shefali Goradia
(74) *Attorney, Agent, or Firm* — St. Onge Steward Johnston & Reens LLC

(57) ABSTRACT

The invention relates to the application area of camera-based head and eye tracking systems. The performance of such systems typically suffers when eye glasses are worn, as the frames of the glasses interfere with the tracking of the facial features utilized by the system. This invention describes how the appearance of the glasses can be utilized by such a tracking system, not only eliminating the interference of the glasses with the tracking but also aiding the tracking of the facial features. The invention utilizes a shape model of the glasses which can be tracked by a specialized tracker to derive 3D pose information.

17 Claims, 4 Drawing Sheets

FOREIGN PATENT DOCUMENTS

| | | |
|---|---|---|
| JP | 2005242428 A | 9/2005 |
| WO | 2004040502 A1 | 5/2004 |
| WO | 2004072897 A2 | 8/2004 |

OTHER PUBLICATIONS

Jacquin et al., "Automatic location, tracking of faces and facial features in video sequences," International workshop on Automatic Face and Gesture Recognition, Zurich, Jun. 1995.*

Baskan et al., "Projection based method for segmentation of human face and its evaluation," Pattern Recognition Letters, Mar. 30, 2001, pp. 1623-1629.*

International Search Report, Jan. 16, 2007, 3 pages.

Japanese Office Action; Application No. JP 2008-542562; Issued: Jun. 14, 2011; 7 pages.

* cited by examiner

VISUAL TRACKING EYE GLASSES IN VISUAL HEAD AND EYE TRACKING SYSTEMS

CROSS-REFERENCE TO RELATED APPLICATIONS

The present application is a continuation of pending International patent application PCT/AU2006/001824 filed on Nov. 30, 2006 which designates the United States and claims priority from Australian patent application 2005906710 filed on Nov. 30, 2005, the content of which is incorporated herein by reference.

FIELD OF THE INVENTION

The present invention relates to the field of face tracking and, in particular, discloses a system of utilizing eye glass information in face tracking to produce enhanced results.

BACKGROUND OF THE INVENTION

As the complexity of technical systems increases, the interaction of operators with these systems increasingly comes into focus. One important aspect is the measurement of facial parameters such as the head pose, the eye gaze direction, eyelid closure and facial expressions. Improvements in computer vision and the availability of cheap computing power allow for consumer grade systems to measure these facial parameters.

An example eye gaze detection system is that proposed in Patent Cooperation Treaty Application Number PCT/AUO1/00249 entitled "Facial Image Processing System" and PCT/AU2004/000413 entitled "Eye tracking system and method" assigned to the assignee of the present application the content of which are hereby incorporated by cross reference.

Typically, in such facial parameter measurement systems, an image sensor is utilised, focused on the operator and deriving the required information from the image sequence in real time. The ability to measure these facial parameters has numerous applications, with many new applications continuously being created.

In some areas such as human-machine interface (HMI) design, it is highly desirable to measure the interaction of operators with the system in order to optimise the design of the system itself. One example is the design of car cockpits and auxiliary devices such as navigation systems. Here it is of utmost importance that the increasing amount of information provided to the driver by the systems does not distract the driver from the primary tracking task. Developers often measure how often and for how long users glance at the control panels in order to obtain a certain piece of information or perform a certain task. This data is then used to optimise the layout of the HMI.

In other systems, the measurement of the facial parameters of the user can be part of the operation of the system itself. For example, in automotive driver assistance systems that derive fatigue and distraction information from facial parameters. Other domains where fatigue is of interest include the operation of technical systems such as flight controllers, military mission control, plant control, heavy equipment control in mining or oil exploration and in other modes of transport such as marine and aviation.

Head and gaze tracking systems are also employed today as personal computer input devices for disabled people. As interfaces to personal computers evolve, head and gaze tracking may become as ubiquitous as computer keyboards and mice. Already systems are available that let users control the face of computer avatars in computer games and chat rooms using a head and eye tracking system.

Head and face tracking also has strong applications in biometric face recognition systems. The localisation and identification of a camera view suitable for recognition are basic capabilities of face recognition systems and are particularly important when the person to be recognised is not cooperating with the system as is the case in typical "face in the crowd" applications.

Systems for accurate face tracking often face particular difficulties where the user is wearing glasses and can fail to operate properly.

SUMMARY OF THE INVENTION

It is an object of the present invention to provide an improved form of face tracking in the presence of glasses or the like.

In accordance with a first aspect of the present invention, there is provided in a face tracking system, a method of tracking facial features, the method including the step of: (a) determining if glass rims, frames or arms form part of the face being tracked; and (b) where the rims, frames or arms form part of the structure, utilizing the rims, frames or arms to track facial features.

The method utilizes the appearance of the frames, rim or arms of the glasses to track a 2D image position or. 3D pose of the glasses frame or the head/face. Preferably, the method utilizes the 2D image position or 3D pose measurements derived from the appearance of frames, rim or arms of the glasses to track the 2D image position or 3D pose of other facial features or the head as a whole. The 2D image position or 3D pose of the glasses are preferably utilized to remove, exclude or weight the image regions covered by the frame, rim, arms or lenses of the glasses for further processing of the facial image. The edges in the image generated by the rim or frame of the glasses or the arms of the frame are preferably used to track the position of the 2D image position or 3D pose of the glasses. A 2D or 3D shape model of the rim or frame of the glasses can be utilized to track the 2D image position or 3D pose of the glasses.

In accordance with a further aspect of the present invention, there is provided a face or facial feature tracking system wherein the appearance of frames, rims or arms of glasses are used as part of a face or facial feature tracking system.

In accordance with a further aspect of the present invention, there is provided a face or facial feature tracking system which utilizes the appearance of the frames, rim or arms of the glasses to track the 2D image position or 3D pose of the glasses frame or the head/face.

In accordance with a further aspect of the present invention, there is provided a method of facial image processing including: (a) tracking the 2D image position or 3D pose of the glasses to remove, exclude or weight the image regions covered by the frame, rim, arms or lenses of the glasses for further processing of the facial image.

In accordance with a further aspect of the present invention, there is provided a method of tracking a glasses frame on a face in a current input image sequence, the method comprising the steps of: utilising a training database of images to derive first example structural information of glasses on a subject; utilising principle component analysis of said first example structural information to derive a generative model of the structural information, said generative model including a series of parameter values; and for the current input image sequence, deriving an initial set of parameter values and a corresponding initial model generated thereby, comparing the initial model with the current input image to derive a difference measure thereof, and altering the parameter values so as to minimise the difference measure.

In one embodiment, the first example structural information includes 3-Dimensional contour information of the glasses. The structural information can include a series of control points for said contour information and the principle component analysis can be done on said control points. The comparison can be done between a projection of the initial model on a 2-dimensional space and a edge detection filtered version of the input image. The minimisation can be done utilising the Levenberg-Marquardt minimisation method.

BRIEF DESCRIPTION OF THE DRAWINGS

Preferred forms of the present invention will now be described with reference to the accompanying drawings in which.

DETAILED DESCRIPTION OF THE INVENTION

Systems of visual face and facial feature tracking typically identify a number of features in the face, such as eyes, eye corners, the mouth or nostrils and track these or other facial features in order to identify the location of the head, the eyes or the eyelids.

The frames of eye glasses typically pose a problem to these systems, as the appearance of glasses differs to other facial features. While the natural features of the face are roughly planar and can be modeled by their local appearance in the vicinity of the central point of the feature, the frames of glasses are generated by a relatively thin rim which is located anywhere between a couple of millimeters to 2 centimeters in front of the face. As the face rotates, the part of the face seen directly behind a point on the frames of the glasses changes, and in the highly structured eye area, the local appearance of features on or around the frame changes considerably. Features close to the frame can become partially occluded by the rim of the frame, rendering them difficult to identify and track. Also, due to the reflectivity of the frames, highlights on the frame itself make tracking of points on the frame difficult.

In the preferred embodiment, the image features that the rim of the glasses generate are utilized to support the facial tracking rather than interfering with it. This is achieved by modeling the appearance of the glasses. This offers two major advantages: Firstly, by tracking the location of the glasses, the tracking of the location of other facial features can be augmented, and secondly by localizing the image locations where the rim of the glasses are present these locations can be discounted for the extraction of information of features behind the rim, foremost features of the eye itself such as iris and pupil locations, reflections on the surface of the eye or the retina, and the coverage of the eyelid over the eye.

By "pose" in the following we refer to a 3D Euclidean transformation.

Figure 1:
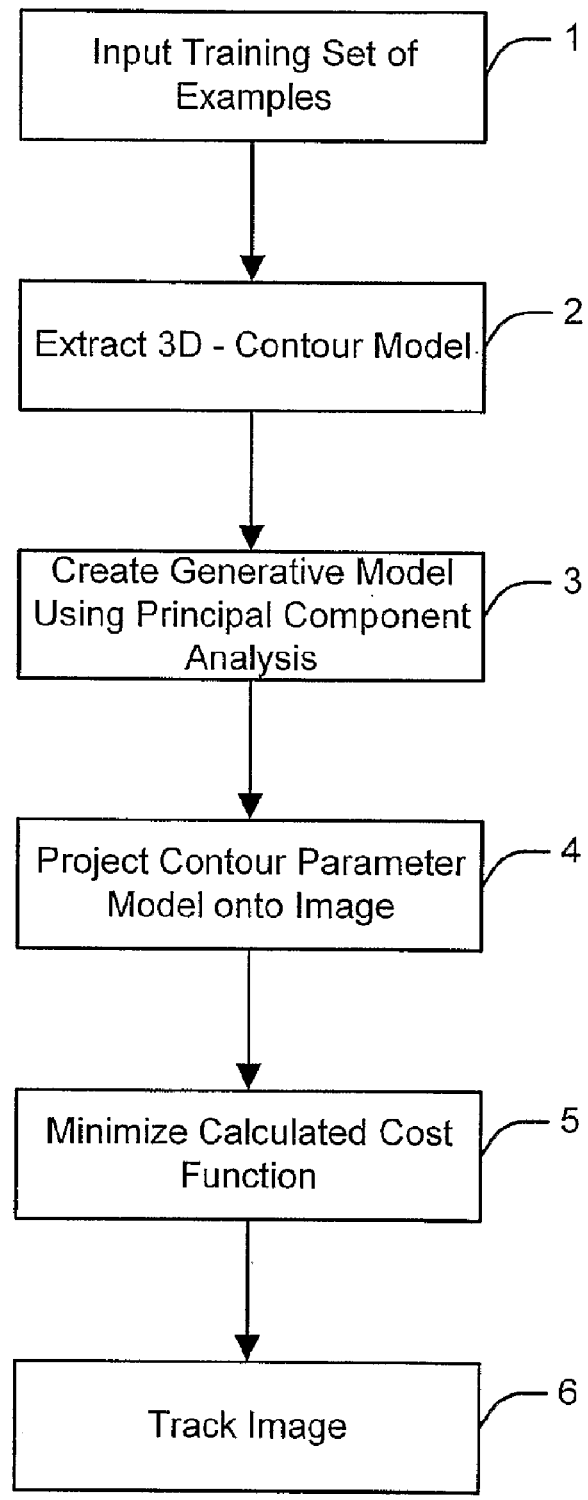
FIG. 1 illustrates the steps of the method of the preferred embodiment.

The steps of the preferred embodiment can be implemented on a suitably programmed computer and are illustrated in FIG. 1.

The preferred embodiment can proceed by using development of a generative model. In this model, a training set of examples is initially provided 1. The training set can consist of numerous examples of users using different types of glasses frames. For each model, a 3-D contour map of actual glasses can be extracted 2 and includes the rims and the arms of the glasses.

Assuming that the camera projection model is known, the complete model of the appearance of glasses in a frame of video is then given by the parameters of the generative shape model and the pose of the glasses.

A generative model can be created 3 using principal component analysis (PCA). The contour of each glasses frame in the training database is discretised into N 3D control points $g_p=(x_p,y_p,z_p)$, $p=1 \ldots N$. PCA is applied to the discretised collection of frame contours in the database. In accordance with the PCA process, the first K eigenvectors are selected to form a lower dimensional parametric model representing the shape of glasses frames. N and K can be selected by a trial and error process to optimise tracking performance. In one example, N=40 and K=16. The mean shape is represented by $g_m$, and the selected eigenvectors, $g_e$, comprise the main modes of variation.

Also derived from the training set are the standard deviations $\delta_e$ for each Eigenvector to model the shapes in the training set. These standard deviations are used to limit the variation scale parameters $\lambda_e$ to three standard deviations $-3\delta_e \leq \lambda_e \leq 3\delta_e$. The scale parameter set $\Lambda=(\lambda_1 \ldots \lambda_{16})$ thereby gives a model the shape of a given glasses frame.

The selected eigenvectors, $g_e$, constitute the basis of the proposed generative model for all reasonable glasses shapes by selecting appropriate shape parameters, $\lambda_e$.

The PCA results provide a mean shape $g_m$ and the main modes of variation $g_e$. The shape of the frames of newly encountered glasses can then be modeled as a linear combination of the mean shape and the modes of variation.

$$G = g_m + \sum_{e \in E} \lambda_e g_e$$

The mean shape and the main modes of variation effectively constitute a model of all reasonable glasses shapes. In our implementation, we use the first 16 Eigenvectors $g_e$, so E=[1.16].

Now the 3D model of the glasses frame is used for tracking. In the preferred embodiment, the glasses tracker is integrated with a feature based head tracker as disclosed in the prior art. However, the glasses tracker could be integrated with any other tracker or could be used by itself.

The shape parameters, $\lambda_e$, may be suitably constrained though stochastic or arbitrary measures. A skilled addressee would identify other modeling techniques are also suitable in establishing estimated control points, such as physical models.

A modeled approximation for the glasses frames is determined by the shape parameters and the 3D pose parameters, $$h = \begin{bmatrix} R_{3\times3} & T_{3\times1} \\ 0 & 1 \end{bmatrix},$$

comprising a rotation matrix, $R_{3\times3}$ and translation vector, $T_{3\times1}$ combined in the form of a homogenous transformation matrix. The glasses tracker uses a measure of how well the contour of a generated shape model fits the edges, i.e. points of high spatial gradient, seen in the image. Given a set of shape parameters $\lambda_e$ and pose parameters h, the difference in location of predicted and actual image edges allows the tracker to adjust the parameters for a better fit.

For a given input image, assuming that the pose of the glasses relative to the face is constant or possibly varying around some mean value, the glasses tracker can be bootstrapped by initially allowing the shape parameters as well as the pose parameters to vary. As soon as a reliable estimate of the glasses shape and the pose of the glasses relative to the face has been determined, the corresponding shape parameters can be held fixed and only the combined pose parameters of glasses and face are allowed to vary.

To determine the shape and pose parameters from video images, the glasses tracker can use a measure of how well the contour of a generated shape model fits the edges, i.e. points of high spatial intensity gradient, seen in the image. Given a set of shape and pose parameters, the difference in location of predicted and actual image edges allows the tracker to adjust the parameters for a better fit. To elaborate, tracking proceeds by minimising a cost function in each video image.

Minimisation is done over the pose and shape parameters and is performed using a nonlinear least squares gradient descent method, e.g. using the well known Levenberg-Marquardt method. The cost function to be minimised can be the sum of squared distances from glasses model contour points to the point of highest image intensity gradient. To compute the cost function, the glasses model is projected into the image 4 using the current estimate of the pose and shape parameters. For each point along the contour of the projected model, image intensity edges are detected along a line perpendicular to the model contour. The strongest edge within a fixed radius is selected and the distance to it is measured. The cost function is then the sum of squared such distances. The minimiser is allowed to run until it converges to a local minimum in each video image 5. Tracking 5 in a video sequence is accomplished by using the optimised parameters from the previous image as a starting point in the current image.

In an exemplary embodiment, the following process is used to derive a metric for the fit of the model with an image. First, a binarised edge image E of the source image is calculated. In the preferred embodiment the edges are found using the well known Canny edge detector. In the second step, the control points G of the glasses model are projected into the binary image by the steps of choosing a shape parameterisation $\Lambda$ of the PCA model, choosing a 3D pose h and then projecting the resulting 3D control points into the image, resulting in the 2D vectors $g_e^i = (x_e^i, y_e^i)$. For each control point $g_e^i$, the Euclidian distance $\Delta_e^i$ between the control point and the closes edge pixel in the edge image E is calculated.

A metric for the glasses only tracking for the fit then is calculated as $$m(h, \Lambda) = \sum_E \Delta_e^i$$

The Levenberg-Marquardt minimization method can be employed to calculate the optimal combination of h and $\Lambda$ as the solution to the combined pose and shape problem.

In an exemplary embodiment of the present invention the solution to the glasses tracker can be integrated into a face or facial feature tracker. To integrate the glasses tracker with a feature based head tracker, such as that disclosed in the prior art, the preferred embodiment adds the distance of the set of facial feature points $f_m$, m$\in$M of a set M of facial feature points to the metric. Each of the facial features is located in each frame by template correlation, resulting in measured image locations $f_m^i$. In addition to the distances of the glasses control points, the distances $\Delta_m^i$ are calculated for an assumed head pose h as the Euclidian distance between the measured points $f_m^i$ and the projected points $f_m^i(h)$. In addition to the head pose h, the pose $h_g$ of the glasses relative to the head must be estimated.

The Levenberg-Marquardt method then calculates the overall best head pose as:

$$\operatorname*{argmin}_{h, h_g, \Lambda} \left( \sum_E \Delta_e^i + \sum_M \Delta_m^i \right)$$

Assuming that the pose $h_g$ of the glasses relative to the face is constant or possibly slowly varying around some mean value, the glasses tracker can be bootstrapped by initially allowing the shape parameters $\Lambda$ as well as the pose parameters h, $h_g$ to vary. As soon as a reliable estimate of the glasses shape $\Lambda$ and the pose $h_g$ of the glasses relative to the face has been determined, the corresponding parameters are held fixed and only the combined pose parameters h of glasses and face are allowed to vary.

Figure 2:
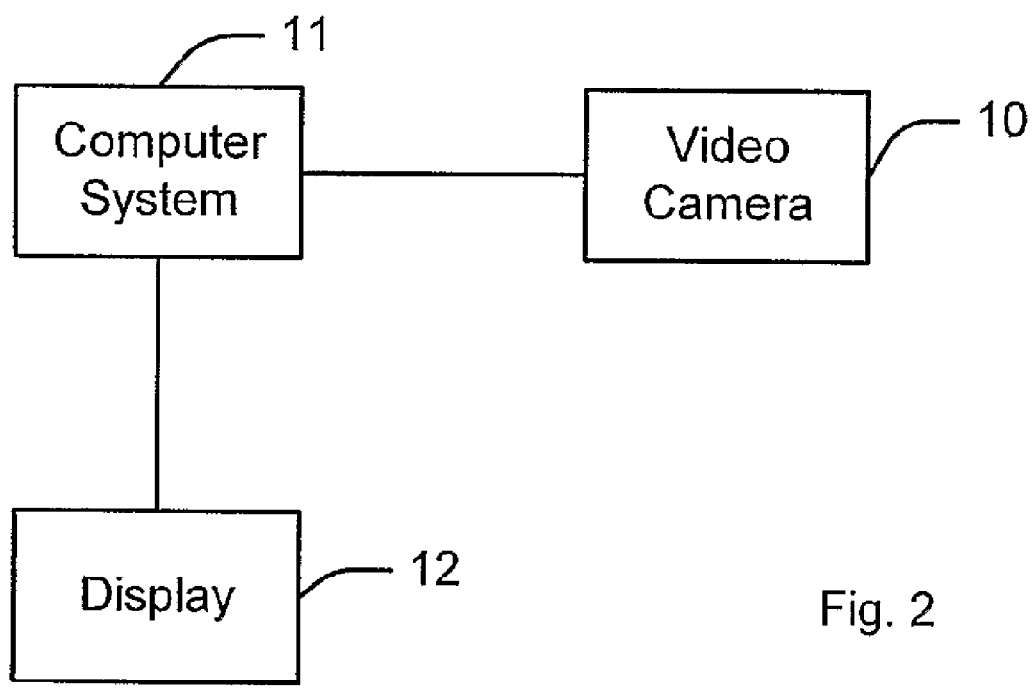
FIG. 2 illustrates an environment for the operation of the preferred-embodiment.
Figure 3:
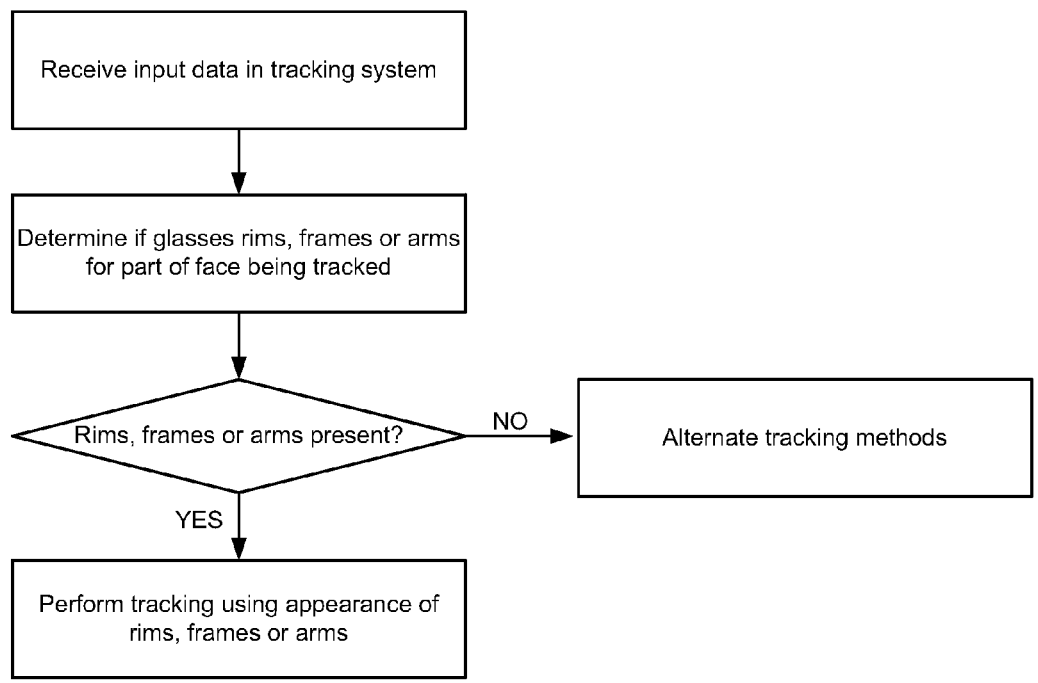
FIG. 3 illustrates a method according to an embodiment.
Figure 4:
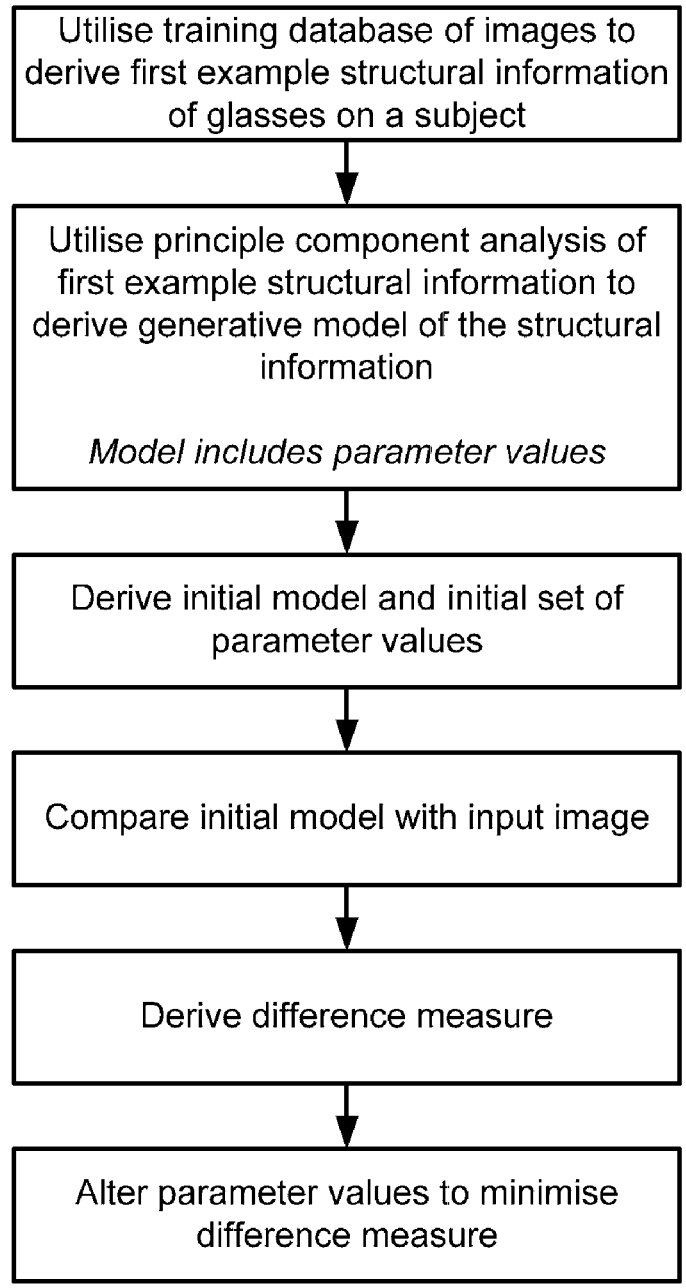
FIG. 4 illustrates a method according to an embodiment.

Upon development of the model, the system is ideally implemented on a computer system having video input capabilities. An example system is illustrated schematically in FIG. 2. A video input 10 is input to the computer system 11 which uses the aforementioned method to continuously track a face with the results being output on display 12.

The forgoing describes preferred forms of the present invention. Modifications, obvious to those skilled in the art can be made thereto without departing from the scope of the invention.

What is claimed is:

1. In a tracking system configured to track a face/head, a method of tracking facial features of the face/head, the method including the step of:
   (a) determining if glasses rims, frames or arms are present on the face/head; and
   (b) where said rims, frames or arms are present on the face/head, determining appearance characteristics of the rims, frames or arms thereby to derive 2D image position or 3D pose measurements of the glasses or the face/head, wherein deriving the 2D image position or 3D pose measurements includes performing analysis thereby to progressively optimise the fit of a three dimensional generative glasses model to a progressive set of sequential input images containing the face/head, wherein the fit is defined in terms of glasses shape parameters and glasses pose parameters.

2. A method as claimed in claim 1 wherein said method utilizes the 2D image position or 3D pose measurements derived from the determined appearance characteristics of frames, rim or arms of the glasses to track a 2D image position or 3D pose of other facial features of the face, or to track a 2D image position or 3D pose of the head as a whole.

3. A method as claimed in claim 1 including, on the basis of the 2D image position or 3D pose measurements, removing, excluding or weighting one or more image regions covered by the frames, rims, arms or lenses of the glasses for further processing an image containing the face/head.

4. A method as claimed in claim 1 wherein one or more edges in the image generated by the rims, frames or arms of the glasses are used to track a position of the 2D image position or 3D pose of the glasses.

5. A method as claimed in claim 1 wherein a 2D or 3D shape model of the rim or frame of the glasses is utilized to derive the 2D image position or 3D pose measurements.

6. A method as claimed in claim 1 wherein a 2D or 3D generative model of the rim or frame of the glasses is utilized to derive the 2D image position or 3D measurements.

7. A face or facial feature tracking system wherein appearance characteristics of frames, rims or arms of glasses worn on a face/head are used as part of a face or facial feature tracking system, including performing analysis thereby to progressively optimise the fit of a three dimensional generative glasses model to a progressive set of sequential input images containing the face/head, wherein the fit is defined in terms of glasses shape parameters and glasses pose parameters.

8. A face or facial feature tracking system which determines appearance characteristics of the frames, rim or arms a pair of glasses worn on the face/head to track the 2D image position or 3D pose of the pair of glasses or the face/head, including performing analysis thereby to progressively optimise the fit of a three dimensional generative glasses model to a progressive set of sequential input images containing the face/head, wherein the fit is defined in terms of glasses shape parameters and glasses pose parameters.

9. A face or facial feature tracking system which utilizes 2D image position or 3D pose measurements derived from appearance characteristics of frames, rim or arms of glasses worn on a face/head to track a 2D image position or 3D pose of other facial features of the face/head or a 2D image position or 3D pose of the head, wherein deriving the 2D image position or 3D pose measurements includes performing analysis thereby to progressively optimise the fit of a three dimensional generative glasses model to a progressive set of sequential input images containing the face/head, wherein the fit is defined in terms of glasses shape parameters and glasses pose parameters.

10. A method of facial image processing including:
(a) receiving data indicative of a progressive set of sequential input facial images; and
(b) tracking, in the facial images, 2D image position or 3D pose of a pair of glasses worn by a face/head, the glasses having a frame, rim, lenses and arms, thereby to remove, exclude or weight one or more image regions covered by the frame, rim, arms or lenses of the glasses for further processing of the facial images, wherein tracking the 2D image position or 3D pose includes performing analysis thereby to progressively optimise the fit of a three dimensional generative glasses model to the input images, wherein the fit is defined in terms of glasses shape parameters and glasses pose parameters.

11. A method of tracking a glasses frame on a face in an input image sequence, the method comprising the steps of:
utilising a training database of images to derive first example structural information of glasses on a subject;
utilising principle component analysis of said first example structural information to derive a three-dimensional generative model of the structural information, said generative model including a series of parameter values; and
for an initial input image in the input image sequence, deriving an initial set of parameter values and a corresponding initial generative model generated thereby, comparing the initial generative model with the initial input image in the input image sequence to derive a difference measure thereof, and altering the parameter values so as to minimise the difference measure;
for a subsequent input image in the input image sequence, deriving a subsequent set of parameter values, using the altered parameter values, and a corresponding subsequent generative model generated thereby, comparing the initial generative model with the initial input image in the input image sequence to derive a difference measure thereof, and altering the parameter values so as to minimise the difference measure.

12. A method as claimed in claim 11 wherein the first example structural information includes 3-Dimensional contour information of the glasses.

13. A method as claimed in claim 12 wherein said structural information includes a series of control points for said contour information.

14. A method as claimed in claim 13 wherein the principle component analysis is done on said control points.

15. A method as claimed in claim 11 wherein said comparison is done between a projection of the initial model on a 2-dimensional space and a edge detection filtered version of the current input image.

16. A method as claimed in claim 11 wherein said minimisation includes Levenberg-Marquardt type minimisation.

17. A method as claimed in claim 11 further comprising incorporating the tracking of the glasses frame into a face tracker.

* * * * *